(12) United States Patent
Kim et al.

(10) Patent No.: US 7,764,593 B2
(45) Date of Patent: Jul. 27, 2010

(54) DOWNLINK SIGNAL CONFIGURING METHOD AND DEVICE IN MOBILE COMMUNICATION SYSTEM, AND SYNCHRONIZATION AND CELL SEARCHING METHOD AND DEVICE USING THE SAME

(75) Inventors: Kwang-Soon Kim, Daejeon (KR); Jae-Young Ahn, Daejeon (KR); Yong Soo Cho, Seoul (KR); Dong-Han Kim, Cheonan (KR)

(73) Assignees: Electronics and Telecommunications Research Institute, Daejeon (KR); Chung-Ang University, Seoul (KR)

( * ) Notice: Subject to any disclaimer, the term of this patent is extended or adjusted under 35 U.S.C. 154(b) by 797 days.

(21) Appl. No.: 10/577,034

(22) PCT Filed: Nov. 19, 2003

(86) PCT No.: PCT/KR03/02494

§ 371 (c)(1),
(2), (4) Date: Jan. 23, 2007

(87) PCT Pub. No.: WO2005/041448

PCT Pub. Date: May 6, 2005

(65) Prior Publication Data

US 2007/0133386 A1 Jun. 14, 2007

(30) Foreign Application Priority Data

Oct. 24, 2003 (KR) ...................... 10-2003-0074693

(51) Int. Cl.
*H04J 11/00* (2006.01)
(52) U.S. Cl. ........................ 370/208; 370/203; 370/330; 370/482; 370/500
(58) Field of Classification Search ........................ None
See application file for complete search history.

(56) References Cited

U.S. PATENT DOCUMENTS 5,867,478 A * 2/1999 Baum et al. ................. 370/203

(Continued)

FOREIGN PATENT DOCUMENTS

JP 2001-024618 1/2001

(Continued)

OTHER PUBLICATIONS

Almenar et al.; "Synchronization Techniques for HIPERLAN/2"; IEEE; 2001; pp. 762-766.

(Continued)

*Primary Examiner*—Huy D Vu
*Assistant Examiner*—Maria L Sekul
(74) *Attorney, Agent, or Firm*—Lowe Hauptman Ham & Berner LLP

(57) ABSTRACT

Disclosed is a downlink signal configuring method and device, and synchronization and cell search method and device using the same in a mobile communication system. A downlink frame has plural symbols into which pilot subcarriers are distributively arranged with respect to time and frequency axes. Initial symbol synchronization and initial frequency synchronization are estimated by using a position at which autocorrelation of a cyclic prefix of a downlink signal and a valid symbol of the downlink is maximized, and cell search and integer-times frequency synchronization are estimated by using pilot subcarriers included in the estimated symbol. Fine symbol synchronization, fine frequency synchronization, and downlink frame synchronization is estimated by using an estimated cell search result. Downlink frequency and time tracking is performed, cell tracking is performed by using a position set of pilot subcarriers inserted into the downlink frame, fine symbol synchronization tracking and fine frequency synchronization tracking are repeated by using the pilot subcarriers to perform the frequency and time tracking of the downlink frame.

2 Claims, 14 Drawing Sheets

U.S. PATENT DOCUMENTS

| | | | |
|---|---|---|---|
| 6,434,205 B1 | 8/2002 | Taura et al. | |
| 6,487,252 B1 * | 11/2002 | Kleider et al. | 375/260 |
| 7,251,291 B1 * | 7/2007 | Dubuc et al. | 375/296 |
| 2002/0159422 A1 * | 10/2002 | Li et al. | 370/342 |
| 2004/0131007 A1 * | 7/2004 | Smee et al. | 370/208 |

FOREIGN PATENT DOCUMENTS

| | | |
|---|---|---|
| JP | 2001-203665 | 7/2001 |
| KR | 10-1998-033158 | 7/1998 |
| WO | 99/44316 | 9/1999 |
| WO | 02/87113 | 10/2002 |

OTHER PUBLICATIONS

Fechtel; "OFDM Carrier and Sampling Frequency Synchronization and Its Performance on Stationary and Mobile Channels"; IEEE; Aug. 2000; pp. 438-441.

* cited by examiner

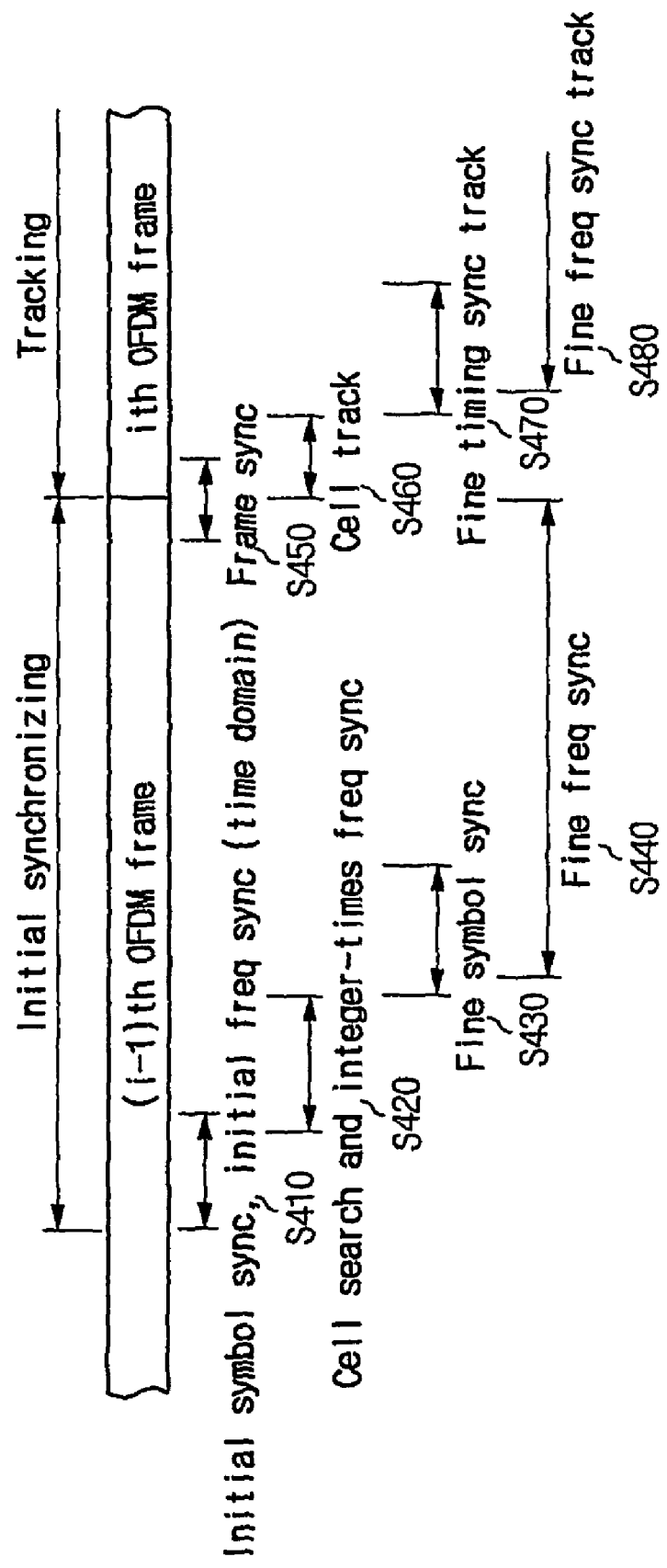

DOWNLINK SIGNAL CONFIGURING METHOD AND DEVICE IN MOBILE COMMUNICATION SYSTEM, AND SYNCHRONIZATION AND CELL SEARCHING METHOD AND DEVICE USING THE SAME

CROSS REFERENCE TO RELATED APPLICATION

This application is the National Phase application of International Application No. PCT/KR2004/002494, filed 19 Nov. 2003, which designates the United States and was published in English. This application, in its entirety, is incorporated herein by reference.

BACKGROUND OF THE INVENTION (a) Field of the Invention

The present invention relates to a downlink signal configuring method and device, and a synchronization and cell searching method and device using the same in a mobile communication system. More specifically, the present invention relates to a system and method for a mobile station to synchronize a time and a frequency and search a cell by using a pilot structure suitable for a downlink in an orthogonal frequency division multiple access-frequency division duplexing (QFDMA-FDD) system and an orthogonal frequency division multiple access-time division duplexing (OFDMA-TDD) system.

(b) Description of the Related Art

In general, it is required for a mobile station to read signals of a base station and synchronize its time and frequency with the base station, and search cells in a cellular system for the purpose of initial synchronization. When initially synchronized, it is also needed for the mobile station to track the time and frequency, synchronize time and frequency of adjacent cells, and search the cells thereof for handover.

Downlinks for enabling initial synchronization, cell search, tracking, and adjacent cell search are provided to the GSM which is a conventional TDMA (time division multiplexing access)-based cellular system, or the IS-95, cdma2000, and W-CDMA which are CDMA (code division multiplexing access)-based cellular systems.

For example, in the W-CDMA system, a P-SCH (primary synchronization channel) and an S-SCH (secondary synchronization channel) of 256-chip lengths are provided for each slot start point so that slot synchronization may be estimated by using the P-SCH, and a scrambling code group number and frame synchronization may be estimated by using the S-SCH. In this instance, a time for estimating the synchronization is minimized by using the P-SCHs of the same pattern for respective slots of each cell, and frame synchronization and a scrambling code group are estimated by using a different pattern per 64 different scrambling code groups and using a different pattern per slot. A P-CPICH (primary common pilot channel) is used to find one of eight major scrambling codes within a scrambling code group, the scrambling code is used to demodulate cell information provided on a P-CCPCH (primary common control channel) and obtain the cell information, and hence, the cell search is finished.

Conventional OFDMA-based systems include the DAB (digital audio broadcasting), the DVB (digital video broadcasting), the IEEE802.11a, and the Hiperlan/2. The DAB uses a null symbol and a phase reference symbol for frame synchronization, and the DVB uses a pilot for the frame synchronization. Also, the IEEE802.11a and the Hiperlan/2 use a preamble to synchronize downlink burst. However, it is difficult for the OFDMA-based cellular systems to perform synchronization and search the cells through the conventional structure since the OFDMA-based systems are not cellular systems.

SUMMARY OF THE INVENTION

It is an advantage of the present invention to provide a method and device for configuring a downlink signal, and a synchronization and cell search method and device using the same in an OFDMA-FDD and OFDMA-TDD cellular system for using a pilot subcarrier without transmitting a preamble, sequentially applying symbol synchronization, frequency synchronization, cell search, and frame synchronization, and performing downlink synchronization and cell search with less calculation.

In one aspect of the present invention, a method for configuring a downlink signal in an orthogonal frequency division multiplexing access-frequency division duplexing (OFDMA-FDD) mobile communication system, comprises: (a) configuring a downlink frame with a plurality of symbols; and (b) inserting pilot subcarriers into each symbol to be distributively arranged therein with respect to a time axis and a frequency axis, part of pilot subcarriers being reference for a mobile station to perform time synchronization, frequency synchronization, and cell search.

In another aspect of the present invention, a method for configuring a downlink signal in an orthogonal frequency division multiplexing access-time division duplexing (OFDMA-TDD) mobile communication system, comprises: (a) configuring a downlink frame with a plurality of symbols, the downlink frame and a seamless uplink frame forming a frame of the mobile communication system; and (b) inserting pilot subcarriers into each symbol to be distributively arranged therein with respect to a time axis and a frequency axis, part of pilot subcarriers being reference for a mobile station to perform time synchronization, frequency synchronization, and cell search.

The pilot subcarriers are inserted at regular intervals with respect to time domain, and are inserted at irregular intervals with respect to frequency domain.

The pilot subcarriers are inserted according to position sets of pilot subcarriers proper to cells.

Proper position sets of pilot subcarriers are allocated in the case of adjacent cells, and position sets of pilot subcarriers are allocated so that the minimum subcarriers may be superimposed in the case of non-adjacent cells when the number of cells is greater than an available number of the proper position sets of pilot subcarriers.

The proper pilot subcarriers corresponding to a predetermined number generated by dividing the number of subcarriers by the number of cells are allocated for each cell, and as to insufficient pilot subcarriers, the cells are divided into cell groups including cells, and part of the proper pilot subcarriers are allocated to the cells which have the same position in different groups to configure a position set of pilot subcarriers for each cell.

In still another aspect of the present invention, a device for configuring a downlink signal in an orthogonal frequency division multiplexing access-frequency division duplexing (OFDMA-FDD) mobile communication system, comprises: a pilot generator for generating a pilot symbol pattern according to external cell number information and a position set pattern of pilot subcarriers, the pilot symbol pattern being inserted into symbols when the downlink frame includes the symbols, and the position set pattern of pilot subcarriers being proper to each cell and including a plurality of pilot subcarriers which are distributively arranged with respect to the time axis and frequency axis for each symbol and are references for a mobile station to perform time synchronization, frequency synchronization, and cell search; and a symbol mapper for mapping external input traffic data information with respect to time and frequency based on the pilot symbol pattern and the position set pattern of pilot subcarriers generated by the pilot generator, and outputting mapped signals to a transmitter of the mobile communication system.

In still another aspect of the present invention, a method for initially synchronizing a downlink signal and searching a cell in an orthogonal frequency division multiplexing access-frequency division duplexing (OFDMA-FDD) mobile communication system wherein a frame of the downlink signal includes a plurality of symbols in which pilot subcarriers are distributively arranged with respect to the time axis and frequency axis, comprises: (a) using a position at which autocorrelation of a cyclic prefix of the downlink signal and a valid symbol of the downlink signal is maximized, and estimating initial symbol synchronization and initial frequency synchronization; (b) using pilot subcarriers included in the symbol having the estimated initial symbol synchronization and initial frequency synchronization, and estimating cell search and integer-times frequency synchronization; (c) using the estimated cell search result and estimating fine symbol synchronization; (d) using the estimated cell search result and estimating fine frequency synchronization; and (e) estimating frame synchronization of the downlink.

In still another aspect of the present invention, a method for initially synchronizing a downlink signal and searching a cell in an orthogonal frequency division multiplexing access—time division duplexing (OFDMA-TDD) mobile communication system wherein a frame of the downlink signal includes a plurality of symbols in which pilot subcarriers are distributively arranged with respect to the time axis and frequency axis, and a downlink frame and a seamless uplink frame form a frame in the mobile communication system, comprises: (a) using a position at which autocorrelation of a cyclic prefix of the downlink signal and a valid symbol of the downlink signal is maximized, and estimating initial symbol synchronization and initial frequency synchronization; (b) using pilot subcarriers included in the symbol having the estimated initial symbol synchronization and initial frequency synchronization, and estimating cell search, integer-times frequency synchronization, and a downlink estimation; (c) using the estimated cell search result and tracking the downlink; (d) using the estimated cell search result and estimating fine symbol synchronization; (e) using the estimated cell search result and estimating fine frequency synchronization; and (f) estimating frame synchronization of the downlink.

The method comprises, after estimating frame synchronization of the downlink: (i) tracking the frequency and time of the downlink; (ii) using the position set of pilot subcarriers inserted into the downlink frame, and tracking the cell; (iii) using the position set of pilot subcarriers, and tracking symbol synchronization; and (iv) using the pilot subcarriers, and tracking fine frequency synchronization, and the steps of (i), (ii), (iii), and (iv) are repeated to track the frequency and time of the downlink frame.

The synchronization process for the downlink signal is stopped and the steps of (a) to (f) are repeated after a predetermined symbol interval, when the link is found to be an uplink in (b).

In still another aspect of the present invention, a device for synchronizing a downlink signal in an orthogonal frequency division multiplexing access-frequency division duplexing (OFDMA-FDD) mobile communication system wherein a frame of the downlink signal includes a plurality of symbols in which pilot subcarriers are distributively arranged with respect to the time axis and frequency axis, comprises: an initial synchronization estimator for estimating initial symbol synchronization and initial frequency synchronization of the downlink signal, using the estimated results and information stored in a cell information storage unit, and performing cell search, integer-times frequency synchronization estimation, fine symbol synchronization estimation, fine frequency synchronization estimation, and frame synchronization estimation; a cell information storage unit for storing information on the cells included in the mobile communication system when the initial synchronization is performed by the initial synchronization estimator; and a tracker for using a position set of pilot subcarriers properly allocated to each cell, and performing cell tracking, fine symbol synchronization tracking, and fine frequency synchronization tracking.

In still another aspect of the present invention, a device for initially synchronizing a downlink signal in an orthogonal frequency division multiplexing access-time division duplexing (OFDMA-TDD) mobile communication system wherein a frame of the downlink signal includes a plurality of symbols in which pilot subcarriers are distributively arranged with respect to the time axis and frequency axis, and a downlink frame and a seamless uplink frame form a frame of the mobile communication system, comprises: an initial synchronization estimator for estimating initial symbol synchronization and initial frequency synchronization of the downlink signal, using the estimated results and information stored in a cell information storage unit, and performing cell search, integer-times frequency synchronization estimation, downlink estimation, downlink tracking, fine symbol synchronization estimation, fine frequency synchronization estimation, and frame synchronization estimation; a cell information storage unit for storing information on the cells included in the mobile communication system when the initial synchronization is performed by the initial synchronization estimator; and a tracker for using a position set of pilot subcarriers properly allocated to each cell, and performing cell tracking, fine symbol synchronization tracking, and fine frequency synchronization tracking.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4A shows a process for time and frequency synchronization on a downlink signal and cell search in an OFDMA-FDD cellular system according to an exemplary embodiment of the present invention;

DETAILED DESCRIPTION OF THE PREFERRED EMBODIMENTS

Figure 1:
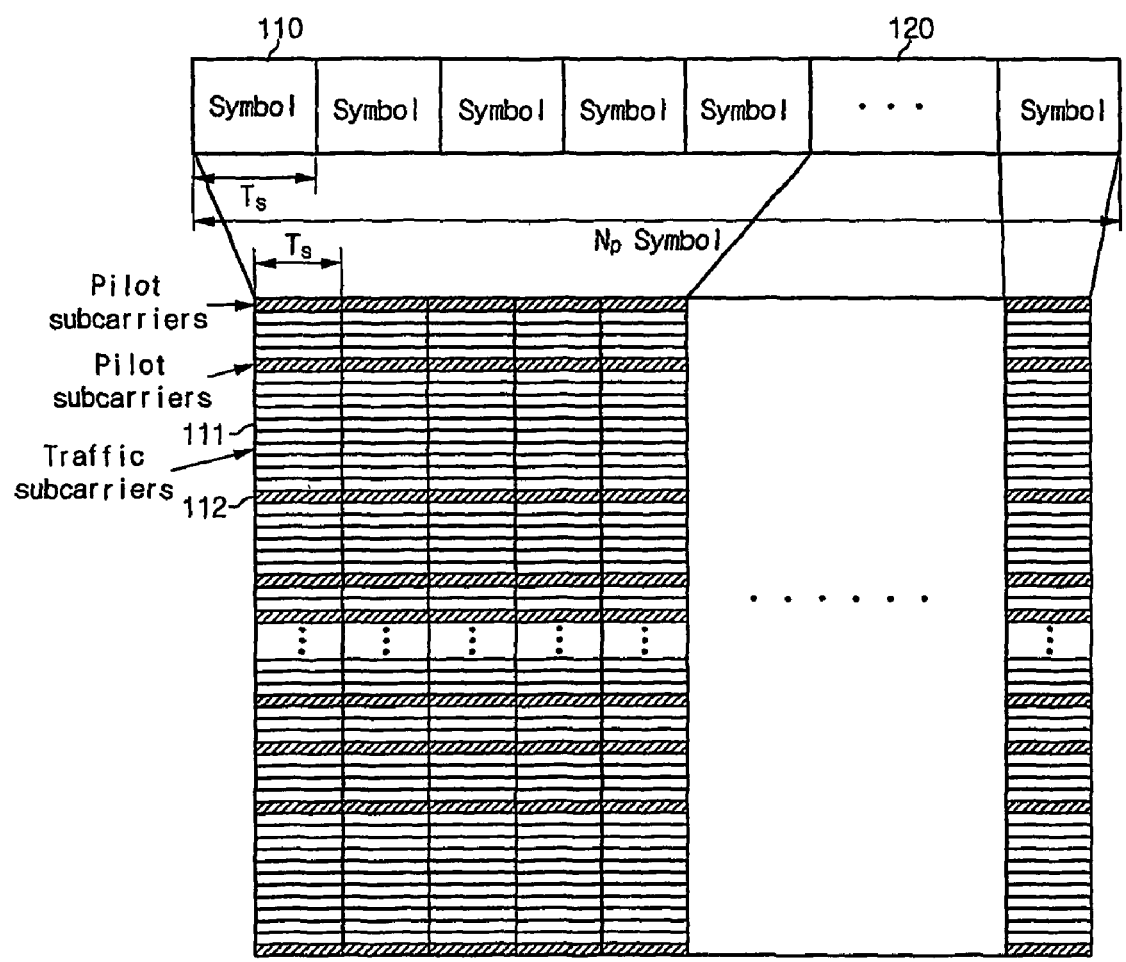
FIG. 1 shows a downlink frame structure and a pilot structure inserted into an OFDM symbol in an OFDMA-FDD cellular system.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

A method for configuring a downlink signal, synchronizing the downlink signal, and searching a cell in an OFDMA-FDD and OFDMA-TDD system will be described with reference to drawings.

A method for configuring a downlink signal in an OFDMA-FDD system will now be described with reference to FIG. 1.

FIG. 1 shows a downlink frame structure and a pilot structure inserted into an OFDM symbol in an OFDMA-FDD cellular system.

As shown, a frame 120 of a downlink signal has Np OFDM symbols 110 with the symbol period of Ts without a preamble.

The OFDM symbol 110 includes traffic subcarriers 111 forming data, and pilot subcarriers 112 having predefined values between a transmitter and a receiver in a 2-dimensional domain with respect to time and frequency.

The pilot subcarrier 112 is constant with respect to time, has irregular intervals with respect to frequency, and is transmitted according to a position set of pilot subcarriers 112 proper to each cell, and a mobile station uses the pilot subcarriers 112 to synchronize time and frequency and search cells.

For clarification of description, no pilot subcarriers inserted for channel estimation are illustrated, and the pilot subcarriers have a similar structure as that of pilot subcarriers used by the general OFDM system.

Figure 2:
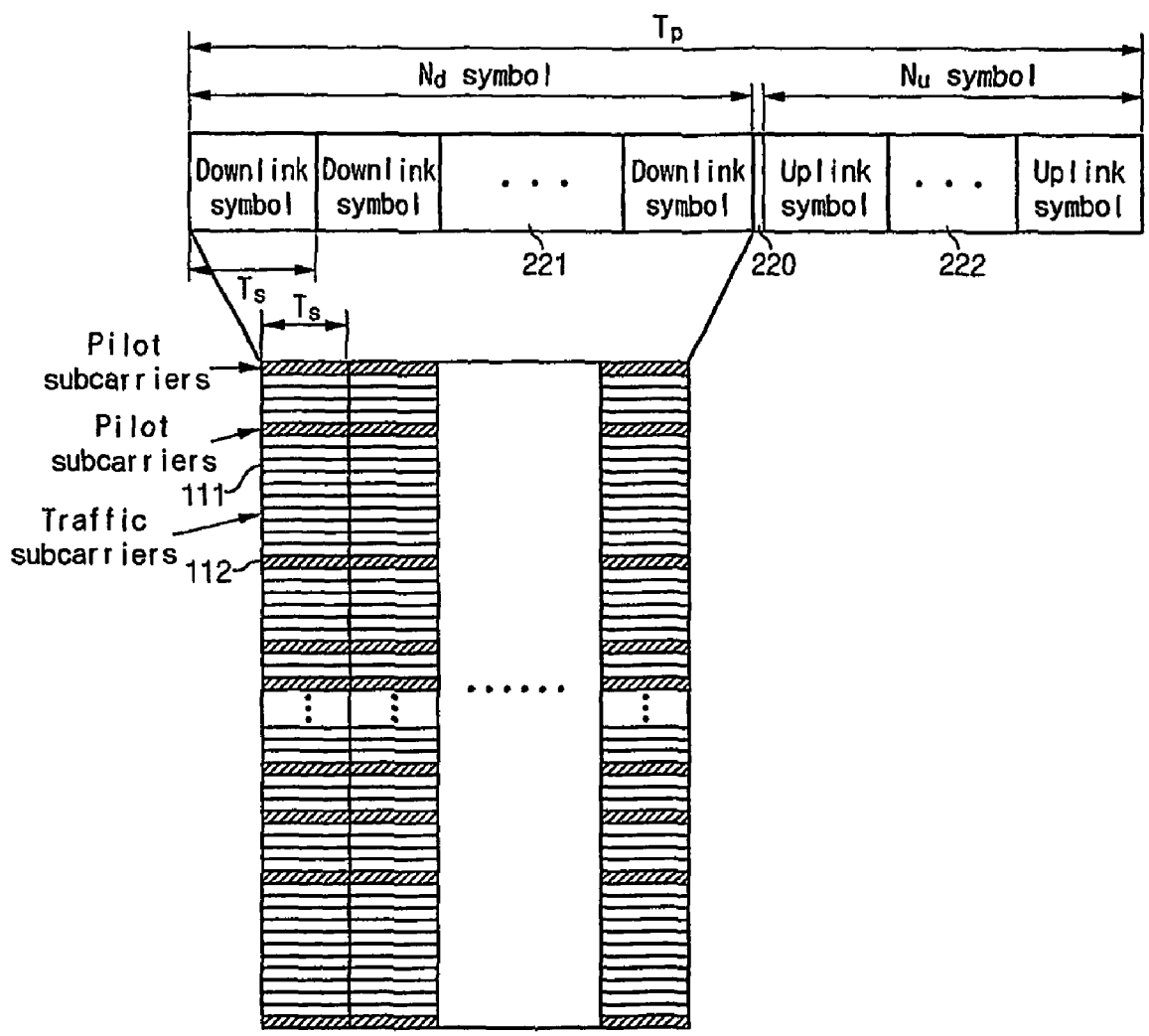
FIG. 2 shows a frame structure and a pilot subcarrier structure inserted into an OFDM symbol in an OFDMA-TDD cellular system.

FIG. 2 shows a frame structure and a pilot subcarrier structure inserted into an OFDM symbol in an OFDMA-TDD cellular system.

As shown, a frame 220 having a time length of Tp includes a downlink subframe 221 and an uplink subframe 222.

The downlink subframe 221 has Nd downlink OFDM symbols 210 with the symbol period of Ts, and the uplink subframe 222 is transmitted by mobile stations covered by the same base station.

The downlink OFDM symbol 210 includes traffic subcarriers 211 forming data, and pilot subcarriers 212 having predefined values between a transmitter and a receiver in a 2-dimensional domain with respect to time and frequency.

The pilot subcarrier 212 is constant with respect to time, has irregular intervals with respect to frequency, is different from the position set of the pilot subcarriers in the uplink subframe 222, is transmitted according to a position set of pilot subcarriers 112 proper to each cell, and a mobile station uses the pilot subcarriers 212 to synchronize time and frequency and search cells.

For clarification of description, no pilot subcarriers inserted for channel estimation are illustrated, and the pilot subcarriers have a similar structure as that of pilot subcarriers used by the general OFDM system.

Figure 3A:
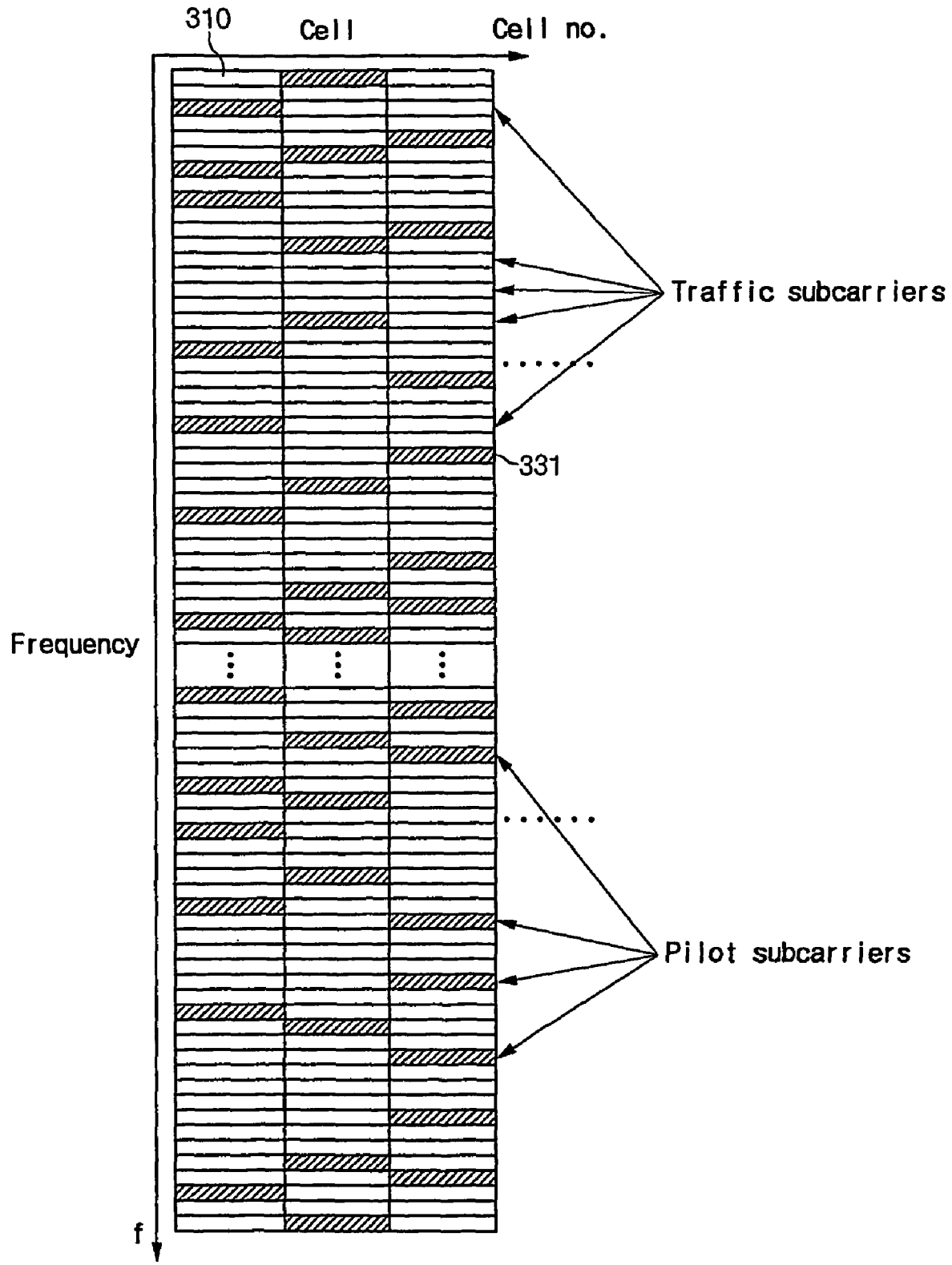
FIG. 3A shows an exemplified allocation of a position set of pilot subcarriers which are proper to cells when the number of cells is less than the available number of sets of pilot subcarrier positions in a downlink signal of an OFDMA-FDD and OFDMA-TDD cellular system according to an exemplary embodiment of the present invention.
Figure 3B:
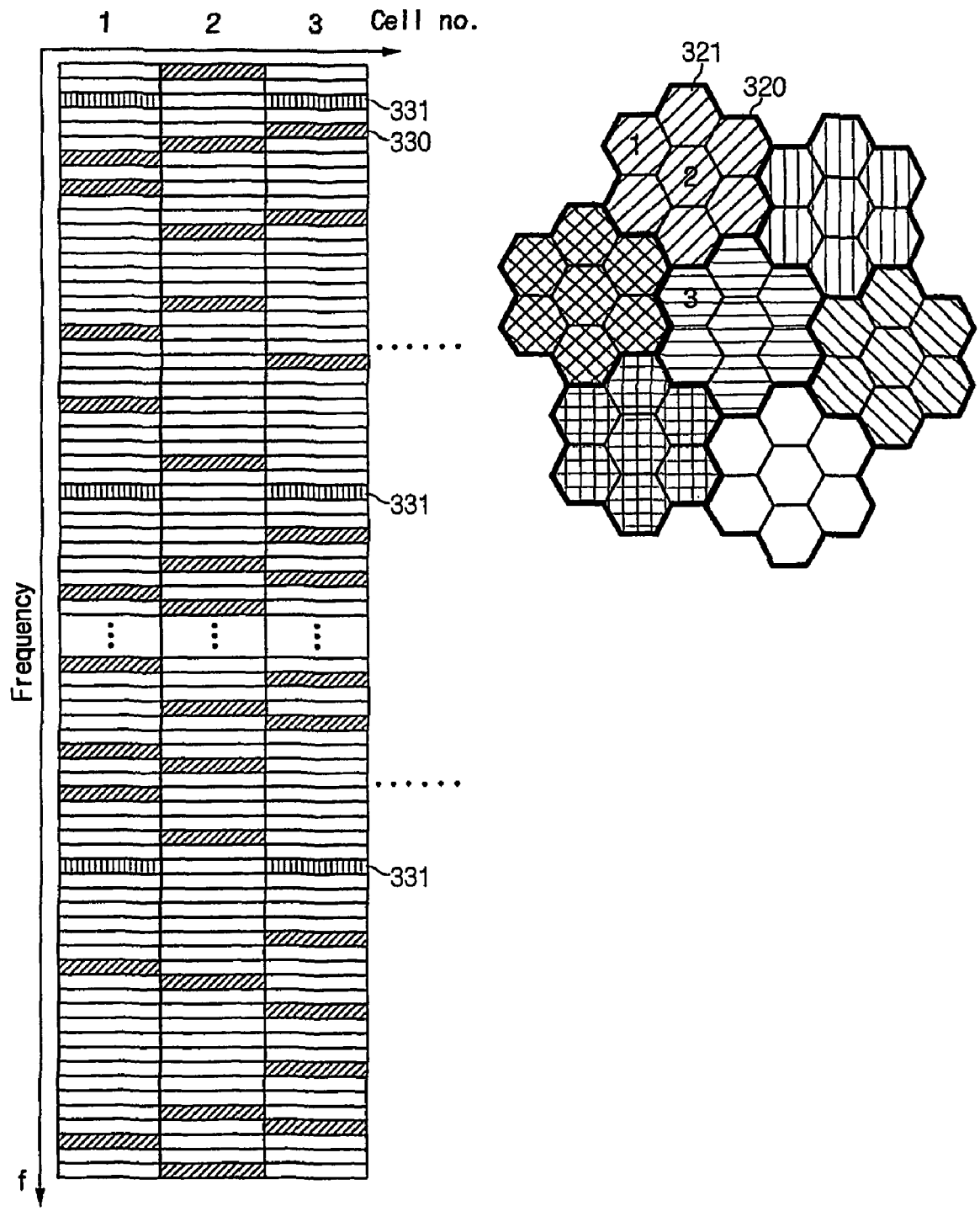
FIG. 3B shows an exemplar of allocating a position set of pilot subcarriers so that a minimum number of pilot subcarriers may be superimposed depending on the cells when the number of cells is greater than the number of sets of pilot subcarrier positions in a downlink signal of an OFDMA-FDD and OFDMA-TDD cellular system according to an exemplary embodiment of the present invention.

Referring to FIGS. 3A and 3B, a method for allocating a position set of pilot subcarriers for each cell in the OFDMA-FDD and OFDMA-TDD downlink signal will be described.

FIG. 3A shows an exemplified allocation of a set of pilot subcarrier positions which are proper to cells when the number of cells is less than the available number of sets of pilot subcarrier positions in a downlink signal of an OFDMA-FDD and OFDMA-TDD cellular system according to an exemplary embodiment of the present invention, FIG. 3B shows an exemplar of allocating a set of pilot subcarrier positions so that a minimum number of pilot subcarriers may be superimposed depending on the cells when the number of cells is greater than the number of sets of pilot subcarrier positions.

As shown in FIG. 3A, when the number of cells is less than the available number of position sets of proper pilot subcarriers, that is, when the number of cells is less than a value obtained by dividing the number of subcarriers used in the frequency domain by the number of pilot subcarriers, the OFDM symbols 310 configuring downlinks of cells have a predetermined number, and are distributed at irregular intervals, and a pilot symbol pattern proper for each cell is transmitted by a position set of pilot subcarriers 311 proper for each cell.

As shown in FIG. 3B, when the number of cells is greater than the available number of position sets of proper pilot subcarriers, that is, when the number of cells is greater than a value obtained by dividing the number of subcarriers used in the frequency domain by the number of pilot subcarriers, the OFDM symbols 310 are distributed at irregular intervals in the frequency domain, a position set of pilot subcarriers proper to each cell is not configured, pilot subcarriers superimposed with each other for each cell are found, and hence, adjacent cell interference may be generated in the cell search process because of the superimposed pilot subcarriers for each cell.

Therefore, in order to reduce the adjacent cell interference in the cell search process, a position set of proper pilot subcarriers is provided to a cell in which the mobile station provided and adjacent cells, and a position set of pilot subcarriers is configured such that the minimum pilot subcarriers of the cell in which the mobile station provided and remote cells may be superimposed.

Also, FIG. 3B shows an exemplified allocation of a position set of pilot subcarriers for reducing inter-cell interference in a cell search process when the cells are arranged by grouping the cells.

When Nu subcarriers except a null subcarrier in the frequency domain are used to generate Nf position sets of Np pilot subcarriers, Nu/Nf proper position sets of pilot subcarriers are allocated to each cell 321, and the minimum number of residual (Np−Nu/Nf) pilot subcarriers 331 are configured to be superimposed on other cells by appropriately selecting pilots allocated to the cells which are provided on the same positions of the other cell group 320.

When the position sets of pilot subcarriers are allocated to the cells as described above, each cell has a proper position set of pilot subcarriers with respect to adjacent cells so that the cell is not interfered by the adjacent cells in the cell search process, and some pilot subcarriers of remote and not-adjacent position sets of pilot subcarriers are superimposed on the pilot subcarriers of the cell in which the mobile station is provided but cell interference is ignored in the cell search process because of large signal attenuation.

Figure 3C:
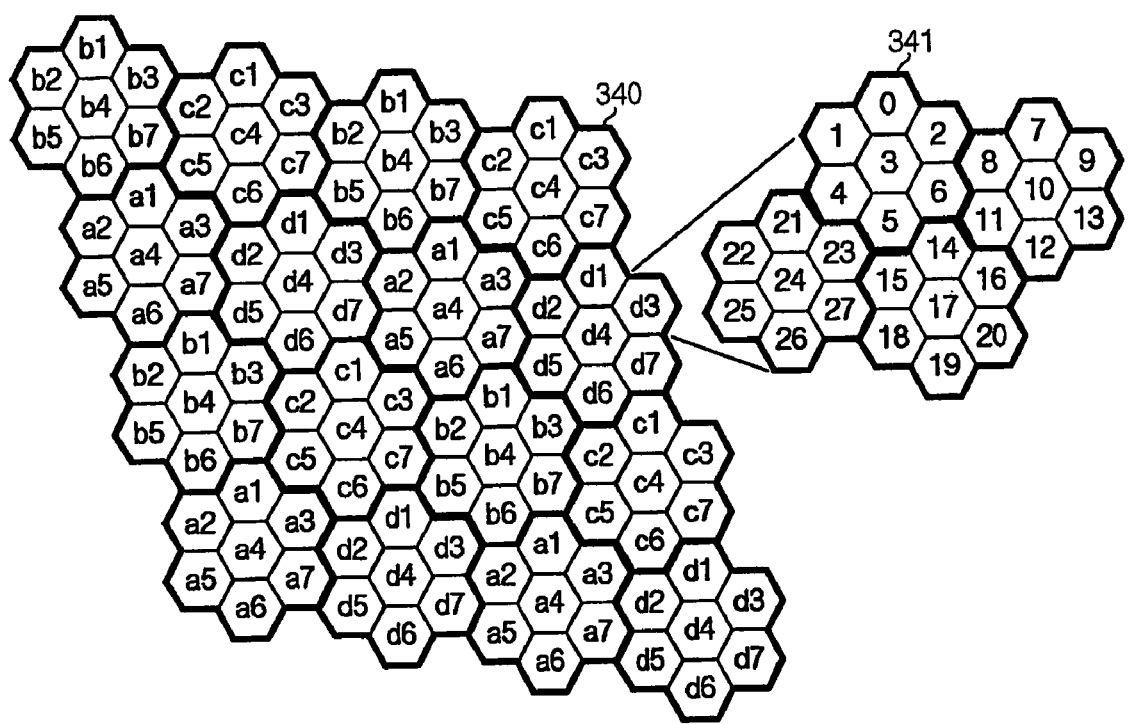
FIG. 3C shows another exemplified allocation of a position set of pilot subcarriers for reducing inter-cell interference in a process of cell search when the cells are arranged by grouping the cells.

FIG. 3C shows another exemplified allocation of a position set of pilot subcarriers for reducing inter-cell interference in a process of cell search when the cells are arranged by grouping the cells 341.

A prime number g satisfying a relation of $Nu/Np >= g$ is selected, gNp subcarriers are selected from among Nu subcarriers and are referred to as K including $f_{K,0}, f_{K,1}, \ldots, f_{K,gNp-1}$.

G ($<=g$) cells are grouped to be a cell group, and a default sequence $h_{imodg}$ is allocated to the $i^{th}$ cell group where it is given that $h_i = \{h_i(k), k=0, \ldots, Np-1\}$ and $h_i(k) = v(k) + (ik) \bmod g$, and $v = \{v(k), k=0, \ldots, Np-1\}$ is pseudorandom sequence with values of from 0 to g−1. A pilot is transmitted to the $j^{th}$ (j=0, . . . , G−1) cell of the $i^{th}$ cell group by using the subcarrier of $K_{ig+j} = \{f_{K,r} | r = kg + (h_{imodg}(k) + j) \bmod g\}$. When the cell groups having the same remainder generated by dividing the cell group number by g are arranged to be far distant with each other, the positions of pilot subcarriers of the cells in the cell group are not superimposed, and Nf/g pilots are superimposed in two cells having different remainders generated by dividing the cell group number by g in the cell group.

Two cells having different cell numbers and having the same remainder generated by dividing the cell group number by g are not superimposed, and two cells having the same cell numbers and the same remainder generated by dividing the cell group number by g use the same pilot subcarrier and are not interfered by large signal attenuation.

When the prime number of g satisfying the relation of $Nu/Nf =< g$ is selected, the other subcarriers other than the Nu transmission subcarriers can be punctured and are not transmitted. It is given in FIG. 3C that g=29, G=28, and a1 to d7 represent that the remainders generated by dividing the cell group number by g are respectively from 0 to 28.

As described, the subsequent synchronization and cell search are more efficiently performed by using the pilot subcarriers of the cells which have irregular intervals therebetween and are not superimposed with each other or the minimum of which are superimposed and accordingly minimizing the inter-cell interference.

Referring to FIGS. 4A to 11, a downlink signal synchronization and cell search method in the OFDMA-FDD and OFDMA-TDD cellular system will be described.

Figure 4B:
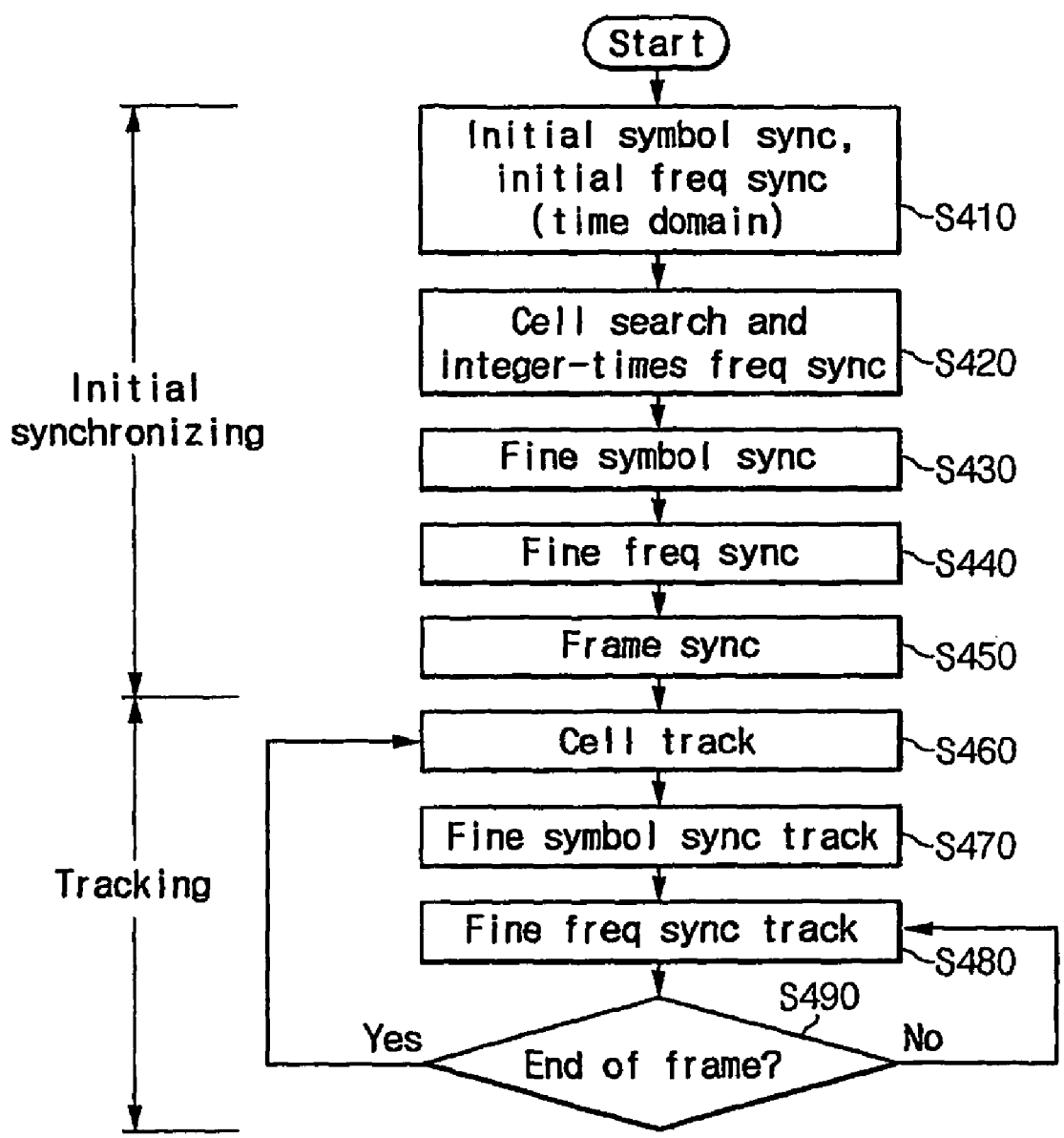
FIG. 4B shows a flowchart for synchronization of a downlink signal and cell search in an OFDMA-FDD cellular system according to an exemplary embodiment of the present invention.

FIG. 4A shows a synchronization process for time and frequency synchronization on a downlink signal and cell search in an OFDMA-FDD cellular system according to an exemplary embodiment of the present invention, and FIG. 4B shows a flowchart for synchronization of a downlink signal and cell search in the OFDMA-FDD cellular system.

As shown in FIGS. 4A and 4B, for initial synchronization, a cyclic prefix (CP) of a downlink OFDM transmission signal is used in the time domain to estimate initial symbol synchronization and initial frequency synchronization in Step S410. A pilot subcarrier included in the sync-estimated symbol is used to search a cell and estimate integer-times frequency synchronization in Step S420. The estimated cell search value is used to estimate fine symbol synchronization in Step S430, estimate fine frequency synchronization in Step S440, and estimate frame synchronization in Step S450.

The cell, time, and frequency are tracked after the initial synchronization is performed. The cell is tracked by using a position set of pilot subcarriers allocated differently for each cell in Step S460. A fast Fourier transform (FFT) process or a discrete Fourier transform (DFT) process is performed on the OFDM received signal to generate a frequency domain signal, and an inverse fast Fourier transform (IFFT) process is performed on a cross-correlation function between the frequency domain signal and a predefined pilot subcarrier to track the time in Step S470. A phase difference between pilot subcarriers of two seamlessly received OFDM symbols in the frequency domain is used to perform fine frequency tracking in Step S480. It is determined in Step S490 whether a frame is finished after the previous step of tracking the fine frequency in S480, and when the frame is not finished, the step of tracking the fine frequency is repeated, and when the frame is finished, the Step S460 of tracking the cell, the Step S470 of tracking the time, and the Step S480 of tracking the frequency are repeated to track the cell, time, and frequency.

Figure 5A:
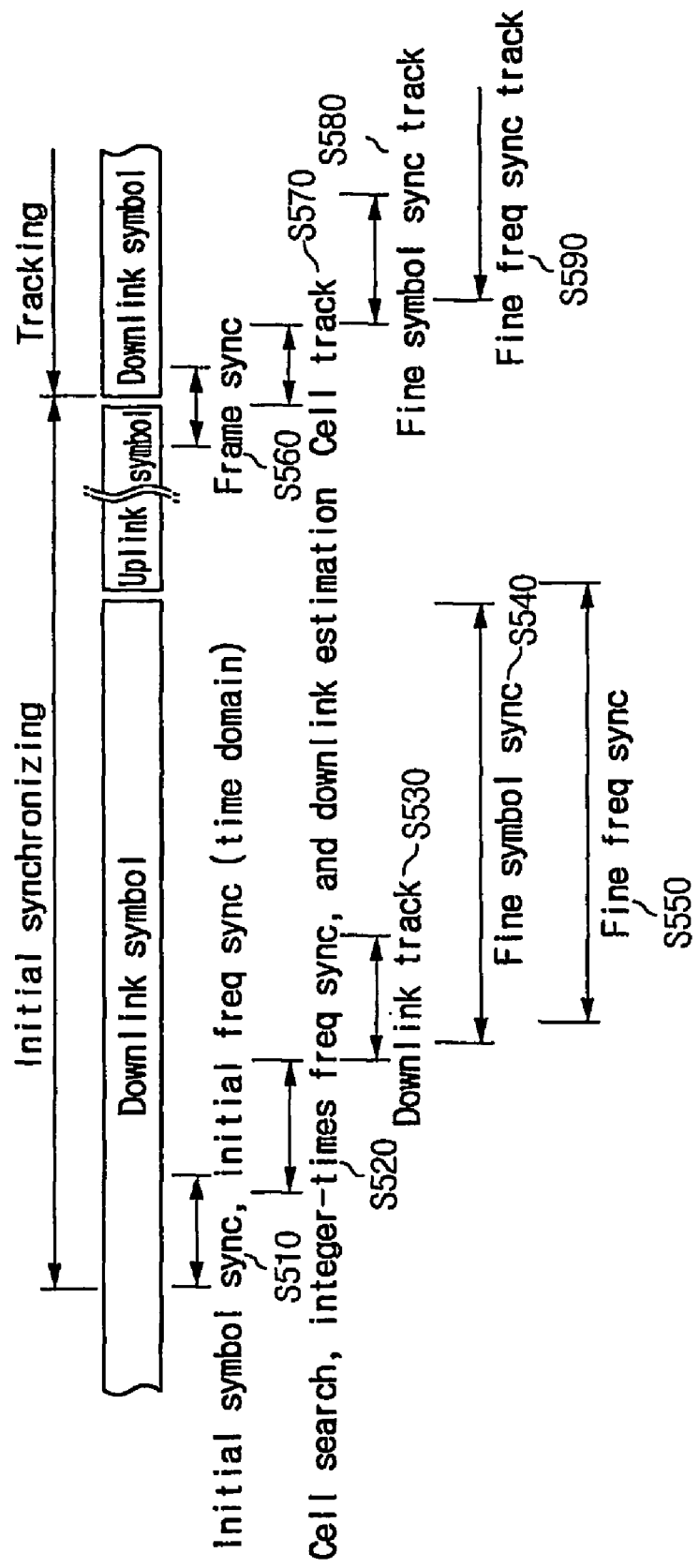
FIG. 5A shows a process for time and frequency synchronization and cell search on a downlink signal in an OFDMA-TDD cellular system according to an exemplary embodiment of the present invention.
Figure 5B:
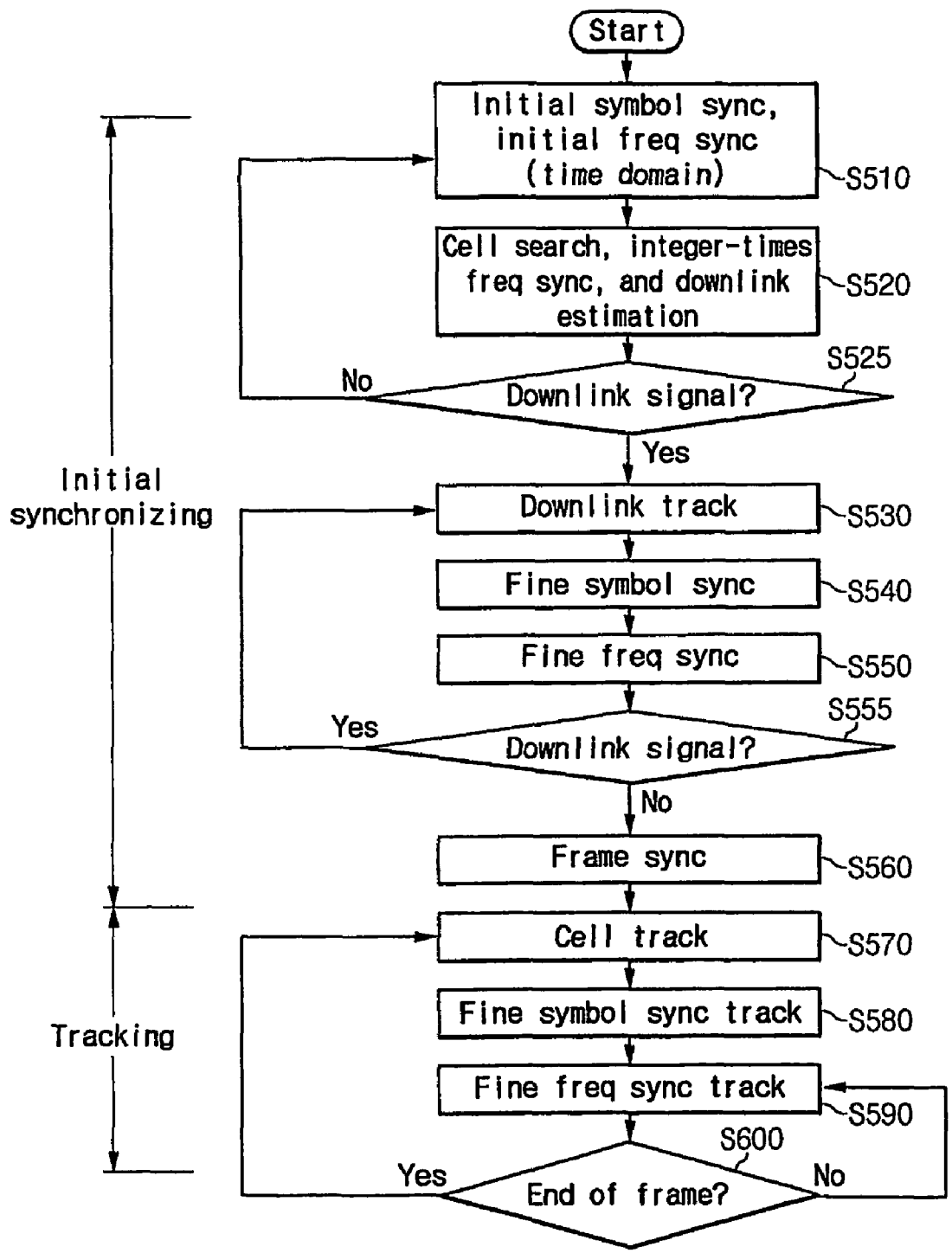
FIG. 5B shows a flowchart for synchronization of a downlink signal and cell search in an OFDMA-TDD cellular system according to an exemplary embodiment of the present invention.

FIG. 5A shows a process for time and frequency synchronization and cell search on a downlink signal in an OFDMA- TDD cellular system according to an exemplary embodiment of the present invention, and FIG. 5B shows a flowchart for synchronization and cell search in an OFDMA-TDD cellular system.

For initial synchronization, a cyclic prefix (CP) of a downlink OFDM transmission signal received in the time domain is used to estimate initial symbol synchronization and initial frequency synchronization in Step S510, pilot subcarriers are used to search cells and estimate integer-times frequency synchronization and downlink in Step S520, the estimated cell search value is used to track the downlink in Step S530, and the estimated cell search value is used to estimate fine symbol synchronization in Step S540 while the downlink is tracked. In a like manner, the estimated cell search value is used to estimate fine frequency synchronization in Step S550 while the downlink is tracked, and the frame synchronization is then estimated in Step S560.

The cell, time, and frequency are tracked after the initial synchronization is performed. The cell is tracked by using the position set of pilot subcarriers which are differently allocated for each cell in Step S570. An FFT or DFT process is performed on the OFDM received signal to generate a frequency domain signal, an IFFT process is performed on a cross-correlation function between the frequency domain signal and a predefined pilot subcarrier to search the position of the maximum value and track the time in Step S580. A phase difference between pilot carriers of seamlessly received two frequency domain OFDM symbols is used to perform fine frequency tracking in Step S590. It is determined in Step S600 whether a frame is finished after the previous step of tracking the fine frequency in S590, and when the frame is not finished, the step of tracking the fine frequency is repeated, and when the frame is finished, the Step S560 of estimating the frame synchronization, the Step S570 of tracking the cell, the Step S580 of tracking the time, and the Step S590 of tracking the frequency are repeated to synchronize the frame and track the cell, time, and frequency.

In the above-described initial synchronization process in the OFDMA-TDD cellular system, a mobile station seamlessly receives downlink signals and uplink signals of adjacent mobile stations, and estimates incorrect time and frequency in the synchronization process based on the uplink signals because mobile stations are randomly provided in the cell and another mobile station for performing initial synchronization receives the summed uplink signals of other mobile stations which have random start positions to thus deteriorate the performance of timing estimation. This phenomenon deteriorates the performance in the process of estimating the frequency offset and the allows the uplink signals of mobile stations in the cell to undergo a Doppler shift together with another frequency offset so that it is difficult for the mobile station which performs the initial synchronization to estimate the frequency offset with the base station.

Therefore, the OFDMA-TDD cellular system requires an initial synchronization process for time and frequency synchronization, differing from the OFDMA-FDD cellular system which controls the mobile station to receive seamless downlink signals. Accordingly, in the above-described initial synchronization processes S510 and S520 for time and frequency synchronization and cell search in the OFDMA-TDD cellular system, the mobile station determines whether a received signal is a downlink signal in Step S525, and performs the initial synchronization process when the received signal is a downlink signal. When the OFDM received signal is estimated to be an uplink signal in the initial synchronization process, the mobile station terminates the current synchronization process, and starts initial symbol synchronization and frequency synchronization (S510) after a predetermined symbol interval.

Also, the mobile station performs the downlink tracking process in Steps S530, S540, and S550 after estimating the downlink signal, finishes the initial synchronization process, determines whether a received OFDM signal is a downlink signal in Step S555, and when the received signal is estimated to be an uplink signal, the mobile station tracks the cell, time, and frequency of a subsequent downlink subframe in Steps S560 to S590. When the received signal is estimated to be a downlink, the mobile station performs a downlink tracking process in Steps S530 to S550.

When the received OFDM signal is estimated to be an uplink signal during the initial synchronization process, the mobile station terminates the current synchronization process, and starts the initial symbol synchronization and frequency synchronization (S510) after a predetermined symbol interval.

Figure 6:
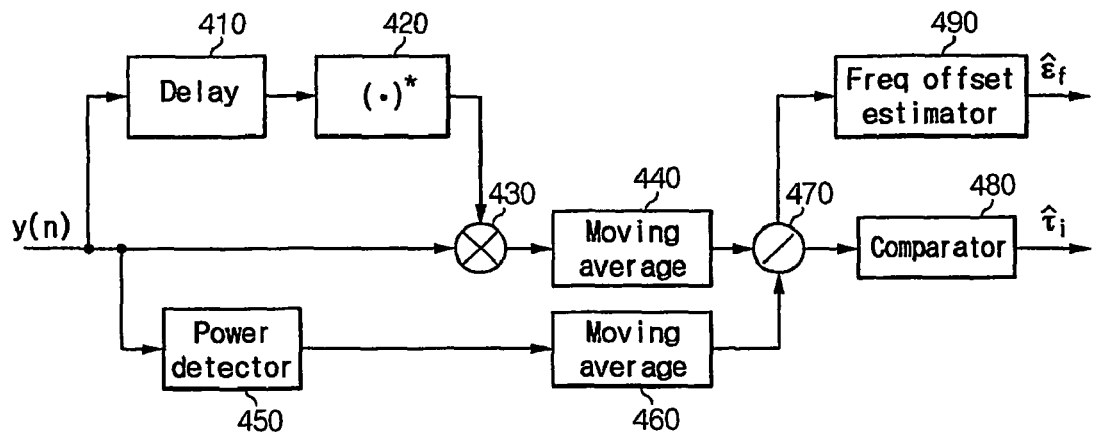
FIG. 6 shows a block diagram of a device for estimating initial symbol synchronization and initial frequency synchronization in an OFDMA-FDD cellular system and an OFDMA-TDD cellular system according to an exemplary embodiment of the present invention.

FIG. 6 shows a block diagram of an estimator for initial symbol synchronization and initial frequency synchronization in an OFDMA-FDD cellular system and an OFDMA-TDD cellular system according to an exemplary embodiment of the present invention.

As shown, the estimator includes a delay unit 410, a conjugate complex generator 420, a multiplier 430, moving average units 440 and 460, a power detector 450, a normalizer 470, a comparator 480, and a frequency offset estimator 490.

The initial symbol synchronization estimates a position at which a cyclic prefix (CP) of an OFDM symbol and an autocorrelation of a valid OFDM symbol are maximized during an OFDM symbol interval.

In detail, a received OFDM signal of y(n+l+N) is delayed by the delay unit 410 by as the length N of the valid OFDM symbol, and a conjugate complex value of y*(n+l) the delayed signal generated by the conjugate complex generator 420 is multiplied with the received signal by the multiplier 430 to output a correlation value of y*(n+l)y(n+l+N), and the moving average unit 440 calculates a moving average $$\sum_{l=0}^{N_{CP}-1} y^*(n+l)y(n+l+N)$$

of the correlation value.

The moving average unit 460 calculates a moving average $$\sum_{l=0}^{N_{CP}-1} |y(n+l+N)|^2$$

of signal power detected by the power detector 450, and the normalizer 470 normalizes the moving average $$\sum_{l=0}^{N_{CP}-1} y^*(n+l)y(n+l+N)$$

with the moving average $$\sum_{l=0}^{N_{CP}-1} |y(n+l+N)|^2.$$

The comparator 480 determines the point which maximizes the correlation value normalized by the normalizer 470 to be a symbol timing $\hat{\tau}_m$ and estimates initial symbol synchronization. Estimation performance of initial symbol synchronization is improved by repeatedly estimating the above-noted process for M symbols. The symbol timing $\hat{\tau}_m$ estimated in the initial symbol synchronization estimation process and the symbol timing $\hat{\tau}_i$ estimated M times are given in Equation 1.

$$\hat{\tau}_m = \max_n \left\{ \left| \sum_{l=0}^{N_{CP}-1} y^*(n+l) y(n+l+N) \right| \bigg/ \sum_{l=0}^{N_{CP}-1} |y(n+l+N)|^2 \right\},$$

$$0 \le n \le N_{sym}$$

$$\hat{\tau}_i = \frac{\sum_{m=0}^{N-1} \hat{\tau}_m}{M}$$

Equation 1 where $\hat{\tau}_i$ is an initial symbol timing, $N_{sym}$ is an OFDM symbol length, y(n) is a received OFDM signal, $N_{CP}$ is a CP length of an OFDM symbol, and N is a valid OFDM symbol length ($N=N_{sym}-N_{CP}$) of the OFDM symbol.

As to the initial frequency synchronization, the frequency offset estimator 490 uses the estimated initial symbol synchronization estimate $\hat{\tau}_m$, and estimates a phase value of a moving average of from the starting point of the symbol which has the maximum moving average of the autocorrelation value to the final CP of the OFDM symbol. The frequency offset estimator 490 receives an output of the normalizer 470 and an output of the comparator 480 to estimate a frequency offset $\hat{\epsilon}_m$. Estimation performance of initial frequency synchronization is improved by repeatedly estimating M symbols. The frequency offset $\hat{\epsilon}_m$ and an initial frequency offset $\hat{\epsilon}_I$ repeatedly estimated M times are given in Equation 2.

$$\hat{\epsilon}_m = \arg \left\{ \sum_{l=\hat{\tau}_m}^{\hat{\tau}_m + N_{CP}-1} y^*(n+l)y(n+l+N) \bigg/ \sum_{l=0}^{N_{CP}-1} |y(n+l+N)|^2 \right\}$$

$$\hat{\epsilon}_I = \frac{\sum_{m=0}^{M-1} \hat{\epsilon}_m}{M}$$

Equation 2 where $\hat{\epsilon}_I$ is an initial frequency offset, $\hat{\tau}_m$ is a symbol timing estimated in the m-th symbol interval, and y(n) is a received OFDM signal.

Since the estimator uses a guard interval and an autocorrelation of the valid OFDM symbol to perform symbol synchronization and frequency synchronization, the delay unit 410, the conjugate complex generator 420, the multiplier 430, the moving average units 440 and 460, and the power detector 450 are configured to be a single device as shown in FIG. 6.

Also, the estimator for initial symbol synchronization and initial frequency synchronization can be realized by using a dedicated device, software for a general-purpose processor, or both the dedicated device and software.

Figure 7:
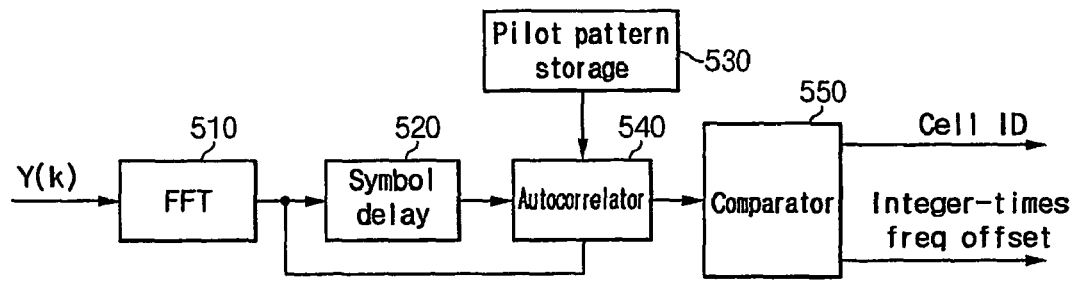
FIG. 7 shows a block diagram of a device for searching a cell and estimating integer-times frequency synchronization by using a downlink signal in an OFDMA-FDD cellular system according to an exemplary embodiment of the present invention.

FIG. 7 shows a block diagram of a device for searching a cell and estimating integer-times frequency synchronization by using a downlink signal in an OFDMA-FDD cellular system according to an exemplary embodiment of the present invention.

As shown, the device includes an FFT unit 510, a symbol delay unit 520, a pilot pattern storage unit 530, an autocorrelator 540, and a comparator 550.

The FFT unit 510 receives an OFDM signal, performs FFT or DFT on the received OFDM signal, and outputs a signal $Y_i[k]$ in the frequency domain. The symbol delay unit 520 delays the signal $Y_i[k]$ by one symbol, and outputs a signal $Y_{i-1}[k]$. The pilot pattern storage unit 530 outputs a position set of pilot subcarriers according to an input cell number. The autocorrelator 540 uses the signal $Y_{i-1}[k]$ and the position set of pilot subcarriers, and outputs an autocorrelated signal $Y_i[k] \cdot Y_{i-1}^*[k]$ within a range in which an integer-times frequency offset is generated. The comparator 550 finds a position set of pilot subcarriers with the maximum autocorrelated value from the autocorrelator 540, and estimates a cell. The cell search estimate is given in Equation 3.

$$\hat{CN} = \max_{CN} \left\{ \max_l \left\{ \left| \sum_{K \subset \{\{K_{CN}\}+l\}} Y_i[k] \cdot Y_{i-1}^*[k] \right| \right\} \right\} - \epsilon_{I_{max}} \le l \le \epsilon_{I_{max}}$$

Equation 3 where $\hat{CN}$ is a cell search estimate, CN is a cell number, $\{K_{CN}\}$ is a position set of pilot subcarriers according to the cell number, $\epsilon_{I_{max}}$ is a maximum integer-times frequency offset, and $Y_i[k]$ is a k-th subcarrier of an FFT-ed signal at the i-th time.

For the purpose of estimation of integer-times frequency synchronization, an autocorrelation value of the cell search estimate $\hat{CN}$, the received frequency domain signal, and one-symbol delayed frequency domain signal is used, and the maximum autocorrelation value generated by moving the position set of pilot subcarriers of the cell having the estimated cyclic shift of the subcarrier generated by the integer-times frequency offset is used. In this instance, since the cell search process by the FFT unit 510, the symbol delay unit 520, the pilot pattern storage unit 530, the autocorrelator 540, and the comparator 550 is required, the cell search process and the integer-times frequency synchronization estimation process are performed as a single process and are realized as a single device as shown in FIG. 7. The estimated integer-times frequency offset is given in Equation 4.

$$\hat{\epsilon}_I = \max_l \left\{ \left| \sum_{K \subset \{\{K_{\hat{CN}}\}+l\}} Y_i[k] \cdot Y_{i-1}^*[k] \right| \right\} - \epsilon_{I_{max}} \le l \le \epsilon_{I_{max}}$$

Equation 4 where $\hat{\epsilon}_I$ is an inter-times frequency offset, $\hat{CN}$ is a cell search estimate, $\epsilon_{I_{max}}$ is a maximum integer-times frequency offset, $\{K_{\hat{CN}}\}$ is a position set of pilot subcarriers transmitted by a base station covering the mobile station, and $Y_i[k]$ is a k-th subcarrier of the FFT-ed signal at the i-th time.

Also, the above-described device can be realized by using a dedicated device, software for a general-purpose processor, or both the dedicated device and software.

Figure 8:
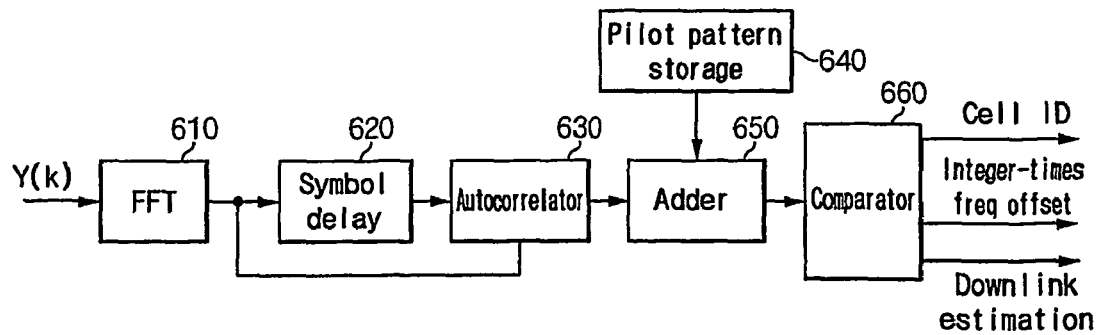
FIG. 8 shows a block diagram of a device for searching a cell and estimating integer-times frequency synchronization, and estimating a downlink in an OFDMA-TDD cellular system according to an exemplary embodiment of the present invention.

FIG. 8 shows a block diagram of a device for searching a cell and estimating integer-times frequency synchronization, and estimating a downlink in an OFDMA-TDD cellular system according to an exemplary embodiment of the present invention.

As shown, the device includes an FFT unit 610, a symbol delay unit 620, an autocorrelator 630, a pilot pattern storage unit 640, an adder 650, and a comparator 660.

The FFT unit 610 receives an OFDM signal, performs FFT or DFT on the received OFDM signal, and outputs a signal $Y_i[k]$ in the frequency domain. The symbol delay unit 620 delays the signal $Y_i[k]$ by one symbol, and outputs a signal $Y_{i-1}[k]$. The pilot pattern storage unit 640 outputs a position set of pilot subcarriers according to an input cell number. The autocorrelator 630 uses the signal $Y_{i-1}[k]$ and is the position set of pilot subcarriers, and outputs an autocorrelated signal $Y_i[k] \cdot Y_{i-1}^*[k]$ within a range in which an integer-times frequency offset is generated. The comparator 660 finds a position set of pilot subcarriers with the maximum autocorrelated value from the autocorrelator 630, and estimates a cell. The cell search estimate is given in Equation 5.

$$\hat{CN} = \max_{CN}\left\{\max_{l}\left\{\left|\sum_{K \subset \{\{K_{CN}\}+l\}} Y_i[k] \cdot Y_{i-1}^*[k]\right|\right\}\right\} - \varepsilon_{Imax} \le l \le \varepsilon_{Imax}$$

Equation 5 where $\hat{CN}$ is a cell search estimate, CN is a cell number, $\{K_{CN}\}$ is a position set of pilot subcarriers according to the cell number, $\varepsilon_{Imax}$ is a maximum integer-times frequency offset, and $Y_i[k]$ is a k-th subcarrier of an FFT-ed signal at the i-th time.

For the purpose of estimation of integer-times frequency synchronization, an autocorrelation value of the cell search estimate $\hat{CN}$, the received frequency domain signal, and one-symbol delayed frequency domain signal is used, and the maximum autocorrelation value generated by moving the position set of pilot subcarriers of the cell having the estimated cyclic shift of the subcarrier generated by the integer-times frequency offset is used. The estimated integer-times frequency offset is given in Equation 6.

$$\hat{\varepsilon}_I = \max_{l}\left\{\left|\sum_{K \subset \{\{K_{\hat{CN}}\}+l\}} Y_i[k] \cdot Y_{i-1}^*[k]\right|\right\} - \varepsilon_{Imax} \le l \le \varepsilon_{Imax}$$

Equation 6 where $\hat{\varepsilon}_I$ is an inter-times frequency offset, $\hat{CN}$ is a cell search estimate, $\varepsilon_{Imax}$ is a maximum integer-times frequency offset, $\{K_{\hat{CN}}\}$ is a position set of pilot subcarriers transmitted by a base station covering the mobile station, and $Y_i[k]$ is a k-th subcarrier of the FFT-ed signal at the i-th time.

Also, as to downlink estimation, the cell search estimate $\hat{CN}$ and the integer-times frequency estimate $\hat{\varepsilon}_I$ are used, and an autocorrelation value generated by moving the position set of pilot subcarriers of the cell estimated with respect to the frequency domain cell by the inter-times frequency offset is compared with a threshold value, and the mobile station estimates a received signal to be a downlink signal when the autocorrelation value is greater than the threshold value, and the mobile station estimates a received signal to be an uplink signal when the autocorrelation value is less than the threshold value. The estimated result is given in Equation 7.

$$\Gamma = \left|\sum_{K \subset \{\{K_{\hat{CN}}\}+\hat{\varepsilon}_I\}} Y_i[k] \cdot Y_{i-1}^*[k]\right|$$

Equation 7 where $\hat{\varepsilon}_I$ is an inter-times frequency offset, $\hat{CN}$ is a cell search estimate, $\{K_{\hat{CN}}\}$ is a position set of pilot subcarriers transmitted by a base station covering the mobile station, and $Y_i[k]$ is a k-th subcarrier of the FFT-ed signal at the i-th time. The estimate signal is a downlink signal when $\Gamma$ is greater than the threshold value, and the same is an uplink signal when $\Gamma$ is less than the threshold value.

Since the cell search process by the FFT unit 610, the symbol delay unit 620, the autocorrelator 630, the pilot pattern storage unit 640, the adder 650, and the comparator 660 is required for estimation of integer-times frequency synchronization and downlink signal, the cell search process, the integer-times frequency synchronization estimation process, and the downlink signal estimation process are performed as a single process and are realized as a single device shown in FIG. 8. In addition, the above-described device can be realized by using a dedicated device, software for a general-purpose processor, or both the dedicated device and software.

Figure 9:
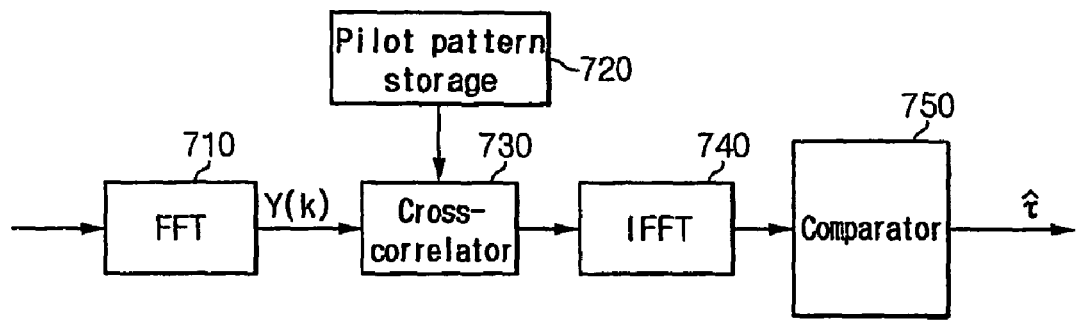
FIG. 9 shows a block diagram of a device for estimating fine symbol synchronization by using a downlink signal in an OFDMA-FDD and OFDMA-TDD cellular system according to an exemplary embodiment of the present invention.

FIG. 9 shows a block diagram of a device for estimating fine symbol synchronization by using a downlink signal in an OFDMA-FDD and OFDMA-TDD cellular system according to an exemplary embodiment of the present invention.

As shown, the device includes an FFT unit 710, a pilot pattern storage unit 720, a cross-correlator 730, an IFFT unit 740, and a comparator 750.

The FFT unit 710 performs FFT or DFT on a received OFDM signal and outputs a frequency domain signal Y(k). The cross-correlator 730 cross-correlates the pilot signal X(k) of the estimated cell stored in the pilot pattern storage unit 720. The IFFT unit 740 performs IFFT on the signal cross-correlated by the cross-correlator 730. The comparator 750 estimates a value which maximizes the output of the IFFT unit 740 to be a fine symbol timing estimate $\hat{\tau}_f$ as given in Equation 8.

$$\hat{\tau}_f = -\max_{n}|IFFT\{Y'(k)X'^*(k)\}|$$

Equation 8 where it is satisfied that $$Y'(k) = \begin{cases} Y(k) & k \subset \{K_{\hat{CN}}\} \\ 0 & k \not\subset \{K_{\hat{CN}}\} \end{cases}, 0 < k < 2048$$

and $$X'(k) = \begin{cases} X(k) & k \subset \{K_{\hat{CN}}\} \\ 0 & k \not\subset \{K_{\hat{CN}}\} \end{cases}, 0 < k < 2048, \text{ and}$$

$\hat{\tau}_f$ is a fine symbol timing estimate, and $\{K_{\hat{CN}}\}$ is a position set of pilot subcarriers transmitted by the base station covering the mobile station.

The above-described fine symbol synchronization estimator can be realized by using a dedicated device, software for a general-purpose processor, or both the dedicated device and software.

Figure 10:
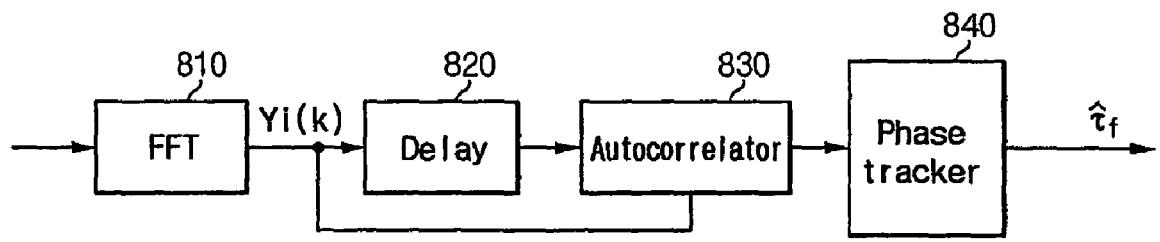
FIG. 10 shows a block diagram of a device for estimating fine frequency synchronization by using a downlink signal in an OFDMA-FDD and OFDMA-TDD cellular system according to an exemplary embodiment of the present invention.

FIG. 10 shows a block diagram of a device for estimating fine frequency synchronization by using a downlink signal in an OFDMA-FDD and OFDMA-TDD cellular system according to an exemplary embodiment of the present invention.

As shown, the device includes an FFT unit 810, a delay unit 820, an autocorrelator 830, and a phase estimator 840.

The FFT unit 810 receives an OFDM signal, performs FFT or DFT on the received OFDM signal, and outputs a signal $Y_i[k]$ in the frequency domain. The delay unit 820 delays the signal $Y_i[k]$ by one symbol, and outputs a signal $Y_{i-1}[k]$. The autocorrelator 830 autocorrelates a pilot subcarrier signal of the one-symbol delayed signal $Y_{i-1}[k]$ and the position set of pilot subcarriers, and outputs a result signal $Y_i[k] \cdot Y_{i-1}^*[k]$ The phase estimator 840 uses a phase of the value autocorrelated by the autocorrelator 830 to estimate a fine frequency offset. The fine frequency offset estimate $\hat{\epsilon}_f$ is given in Equation 9.

$$\hat{\epsilon}_f = \frac{1}{2\pi(1 + N_{CP}/N)} \arg \left\{ \sum_{K \subset \{K_{CN}\}} Y_i[k] \cdot Y_{i-1}^*[k] \right\} \quad \text{Equation 9}$$

where $\hat{\epsilon}_f$ is a fine frequency offset, $\{K_{CN}\}$ is a position set of pilot subcarriers transmitted by the base station covering the mobile station, $Y_i[k]$ is a k-th subcarrier of the FFT-ed signal at the i-th time, $N_{CP}$ is a CP length of an OFDM symbol, and N is a valid OFDM symbol length of the OFDM symbol.

The above-described fine frequency synchronization estimator can be realized by using a dedicated device, software for a general-purpose processor, or both the dedicated device and software.

Figure 11:
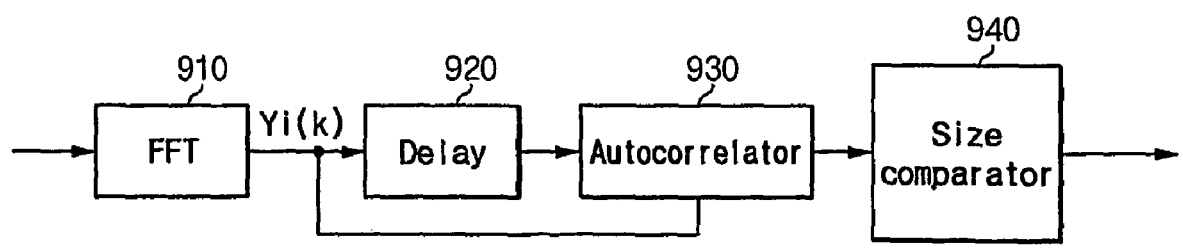
FIG. 11 shows a block diagram of a device for tracking a downlink by using a downlink signal in an OFDMA-TDD cellular system according to an exemplary embodiment of the present invention.

FIG. 11 shows a block diagram of a device for tracking a downlink by using a downlink signal in an OFDMA-TDD cellular system according to an exemplary embodiment of the present invention.

As shown, the device includes an FFT unit 910, a delay unit 920, an autocorrelator 930, and a size comparator 940.

The FFT unit 910 receives an OFDM signal, performs FFT or DFT on the received OFDM signal, and outputs a signal $Y_i[k]$ in the frequency domain. The delay unit 920 delays the signal $Y_i[k]$ by one symbol, and outputs a signal $Y_{i-1}[k]$. The autocorrelator 830 autocorrelates a pilot subcarrier signal of the one-symbol delayed signal $Y_{i-1}[k]$ and a pilot subcarrier of the OFDM signal, and outputs a result signal $Y_i[k] \cdot Y_{i-1}^*[k]$.

The size comparator 940 compares the autocorrelated value with a threshold value, and estimates the autocorrelated value to be a downlink signal when the autocorrelated value is greater than the threshold value, and estimates the same to be an uplink signal when the autocorrelated value is less than the threshold value. The cell search estimate $\Gamma$ is given in Equation 10.

$$\Gamma = \left| \sum_{K \subset \{K_{CN}\}} Y_i[k] \cdot Y_{i-1}^*[k] \right| \quad \text{Equation 10}$$

where $\mathcal{CN}$ is a cell search estimate, $\{K_{CN}\}$ is a position set of pilot subcarriers transmitted by a base station covering the mobile station, and $Y_i[k]$ is a k-th subcarrier of the FFT-ed signal at the i-th time. The cell search estimate signal $\Gamma$ is a downlink signal when $\Gamma$ is greater than the threshold value, and the same is an uplink signal when $\Gamma$ is less than the threshold value.

The autocorrelation process by the FFT unit 910, the delay unit 920, and the autocorrelator 930 corresponds to the autocorrelation process in the fine frequency synchronization estimator described with reference to FIG. 10, and hence, the FFT unit 810, the delay unit 820, and the autocorrelator 830 can be shared as a single one as shown in FIG. 10.

The above-described downlink tracker can be realized by using a dedicated device, software for a general-purpose processor, or both the dedicated device and software.

Figure 12:
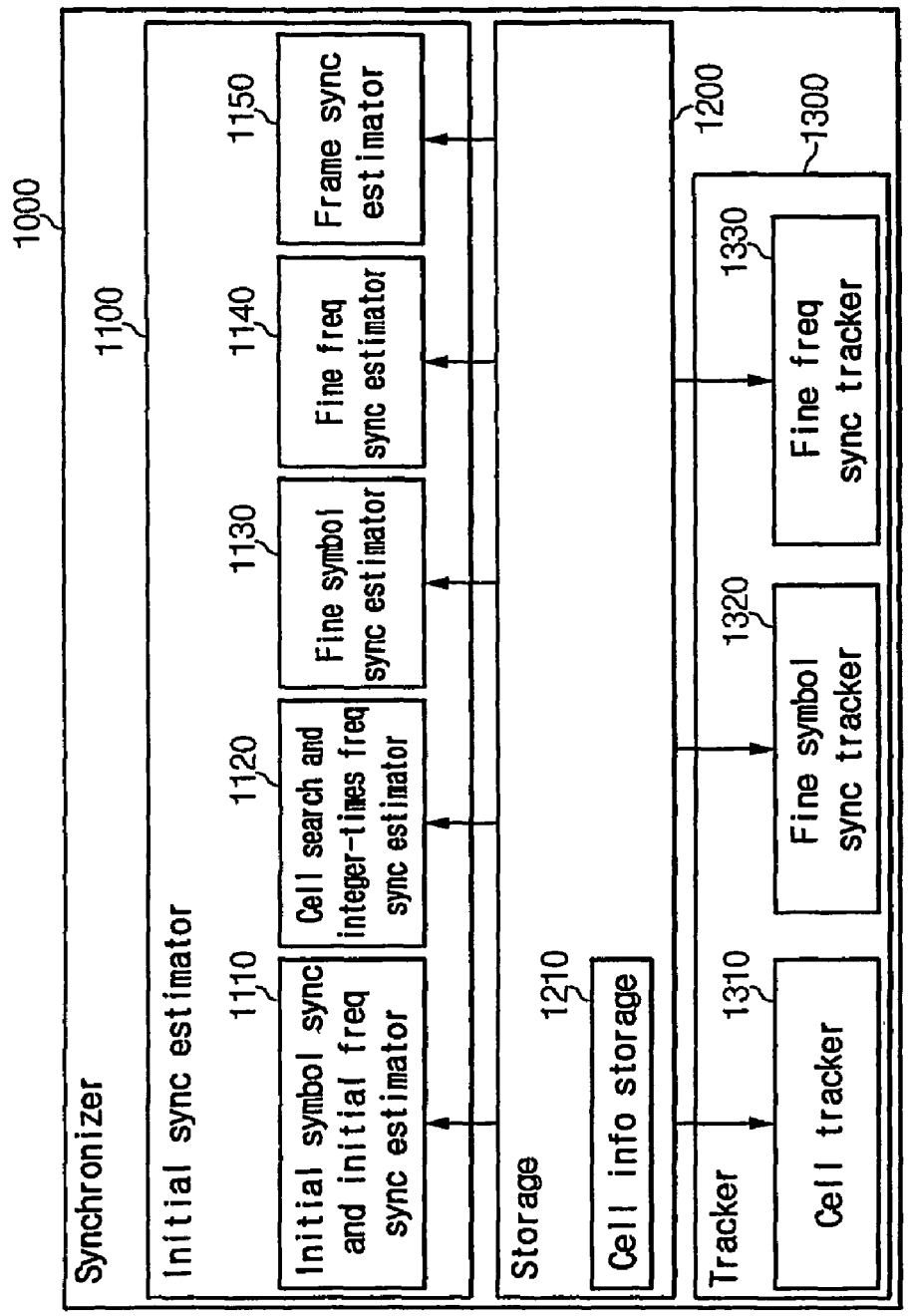
FIG. 12 shows a synchronizer of a mobile station in an OFDMA-FDD cellular system according to an exemplary embodiment of the present invention.
Figure 13:
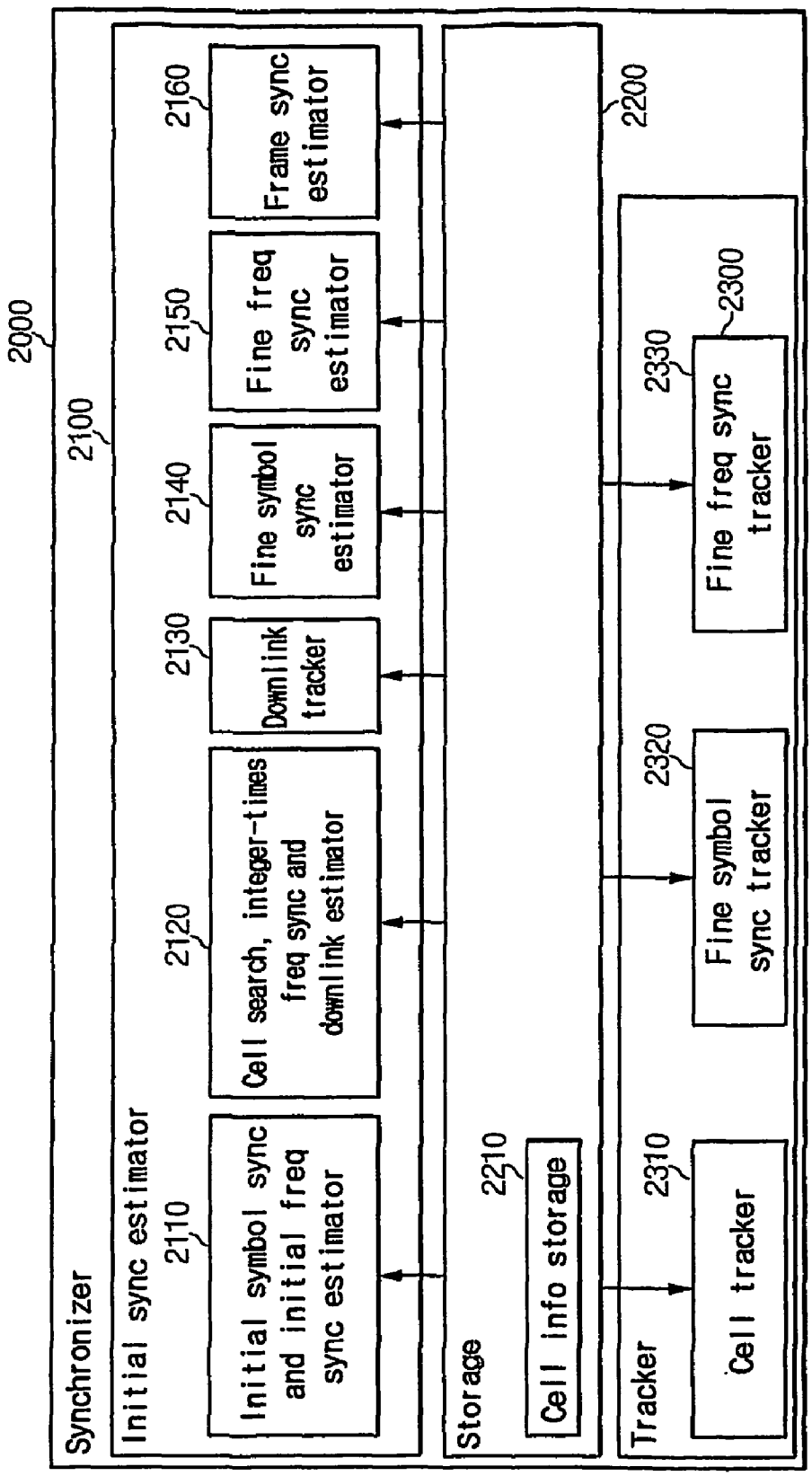
FIG. 13 shows a synchronizer of a mobile station in an OFDMA-TDD cellular system according to an exemplary embodiment of the present invention.

Referring to FIGS. 12 and 13, a synchronizer of the mobile station for performing synchronization and cell search described with reference to FIGS. 4A to 11 will be described in detail.

FIG. 12 shows a synchronizer 100 of a mobile station in an OFDMA-FDD cellular system according to an exemplary embodiment of the present invention.

As shown 12, the synchronizer 100 includes an initial synchronization estimator 1100, a storage unit 1200, and a tracker 1300.

The initial synchronization estimator 1100 includes an initial symbol synchronization and initial frequency synchronization estimator 1110, a cell search and integer-times frequency synchronization estimator 1120, a fine symbol synchronization estimator 1130, a fine frequency synchronization estimator 1140, and a frame synchronization estimator 1150.

The initial symbol synchronization and initial frequency synchronization estimator 1110 uses a cyclic prefix (CP) of a received OFDM signal to estimate initial symbol synchronization and initial frequency synchronization, and the cell search and integer-times frequency synchronization estimator 1120 uses a pilot subcarrier of a frequency domain signal generated by performing FFT or DFT on the received OFDM signal and performs cell search and integer-times frequency synchronization estimation. The fine symbol synchronization estimator 1130 uses the cell search estimate estimated by the cell search and integer-times frequency synchronization estimator 1120, and uses a position set of pilot subcarriers and a pilot symbol pattern provided by a cell information storage unit 1210 to estimate fine symbol synchronization. The fine frequency synchronization estimator 1140 uses the cell search estimate estimated by the cell search and integer-times frequency synchronization estimator 1120, and uses a position set of pilot subcarriers and a pilot symbol pattern provided by a cell information storage unit 1210 to estimate fine frequency synchronization. The frame synchronization estimator 1150 uses the initial symbol synchronization estimated by the initial symbol synchronization and initial frequency synchronization estimator 1110 and the initial frequency synchronization to perform frame synchronization.

The tracker 1300 includes a cell tracker 1310, a fine symbol synchronization tracker 1320, and a fine frequency synchronization tracker 1330.

The cell tracker 1310 uses a position set of pilot subcarriers properly allocated to each cell to perform cell search, the fine symbol synchronization tracker 1320 performs IFFT on the cross-correlation between the received pilot subcarrier and a predefined pilot subcarrier to estimate the position of the maximum value, and the fine frequency synchronization tracker 1330 uses a phase difference between pilot subcarriers of the frequency domain signal generated by performing FFT on the received OFDM signal to perform frequency tracking.

The storage unit 1200 includes a cell information storage unit 1210 for storing cell synchronization information and cell information.

The fine symbol synchronization estimator 1130 of the initial synchronization estimator 1100 and the fine symbol synchronization tracker 1320 of the tracker 1300 can be shared as a single one, and the fine frequency synchronization estimator 1140 of the initial synchronization estimator 1100 and the fine frequency synchronization tracker 1330 of the tracker 1300 can also be shared as a single one.

FIG. 13 shows a synchronizer 2000 of a mobile station in an OFDMA-TDD cellular system according to an exemplary embodiment of the present invention.

As shown, the synchronizer 2000 includes an initial synchronization estimator 2100, a storage unit 2200, and a tracker 2300.

The initial synchronization estimator 2100 includes an initial symbol synchronization and initial frequency synchronization estimator 2110, a cell search and integer-times frequency synchronization and downlink estimator 2120, a downlink tracker 2130, a fine symbol synchronization estimator 2140, a fine frequency synchronization estimator 2150, and a frame synchronization estimator 2160.

The initial symbol synchronization and initial frequency synchronization estimator 2110 uses a cyclic prefix (CP) of a received OFDM signal to estimate initial symbol synchronization and initial frequency synchronization, the cell search and integer-times frequency synchronization and downlink estimator 2120 uses a pilot subcarrier of a frequency domain signal generated by performing FFT or DFT on the received OFDM signal to perform cell search, integer-times frequency synchronization estimation, and downlink estimation. The downlink tracker 2130 uses a cell search estimate provided by the cell search and integer-times frequency synchronization and downlink estimator 2120 and a position set of pilot subcarriers provided by the cell information storage unit 2210 of the storage unit 2200 to track the downlink in the initial stage. The fine symbol synchronization estimator 2140 uses a cell search estimate provided by the cell search and integer-times frequency synchronization and downlink estimator 2120 and a position set of pilot subcarriers and a pilot symbol pattern provided by the cell information storage unit 2210 of the storage unit 2200 to perform fine symbol synchronization estimation. The fine frequency synchronization estimator 2150 uses a cell search estimate provided by the cell search and integer-times frequency synchronization and downlink estimator 2120 and a position set of pilot subcarriers provided by the cell information storage unit 2210 to perform fine frequency synchronization estimation. The frame synchronization estimator 2160 uses the initial symbol synchronization and initial frequency synchronization estimated by the initial symbol synchronization and initial frequency synchronization estimator 2110 to perform frame synchronization.

The tracker 2300 includes a cell tracker 2310, a fine symbol synchronization tracker 2320, and a fine frequency synchronization tracker 2330.

The cell tracker 2310 uses a position set of pilot subcarriers properly allocated to each cell to identify cells, the fine symbol synchronization tracker 2320 performs IFFT on the cross-correlation between the received pilot subcarrier and a predefined pilot subcarrier to estimate the position of the maximum value, and the fine frequency synchronization tracker 2330 uses a phase difference between pilot subcarriers of the frequency domain signal generated by performing FFT on the received OFDM signal to perform frequency tracking.

The storage unit 2200 includes a cell information storage unit 2210 for storing cell synchronization information and cell information.

The fine symbol synchronization estimator 2140 of the initial synchronization estimator 2100 and the fine symbol synchronization tracker 2320 of the tracker 2300 can be shared as a single one, and the fine frequency synchronization estimator 2150 of the initial synchronization estimator 2100 and the fine frequency synchronization tracker 2330 of the tracker 2300 can also be shared as a single one.

Figure 14:
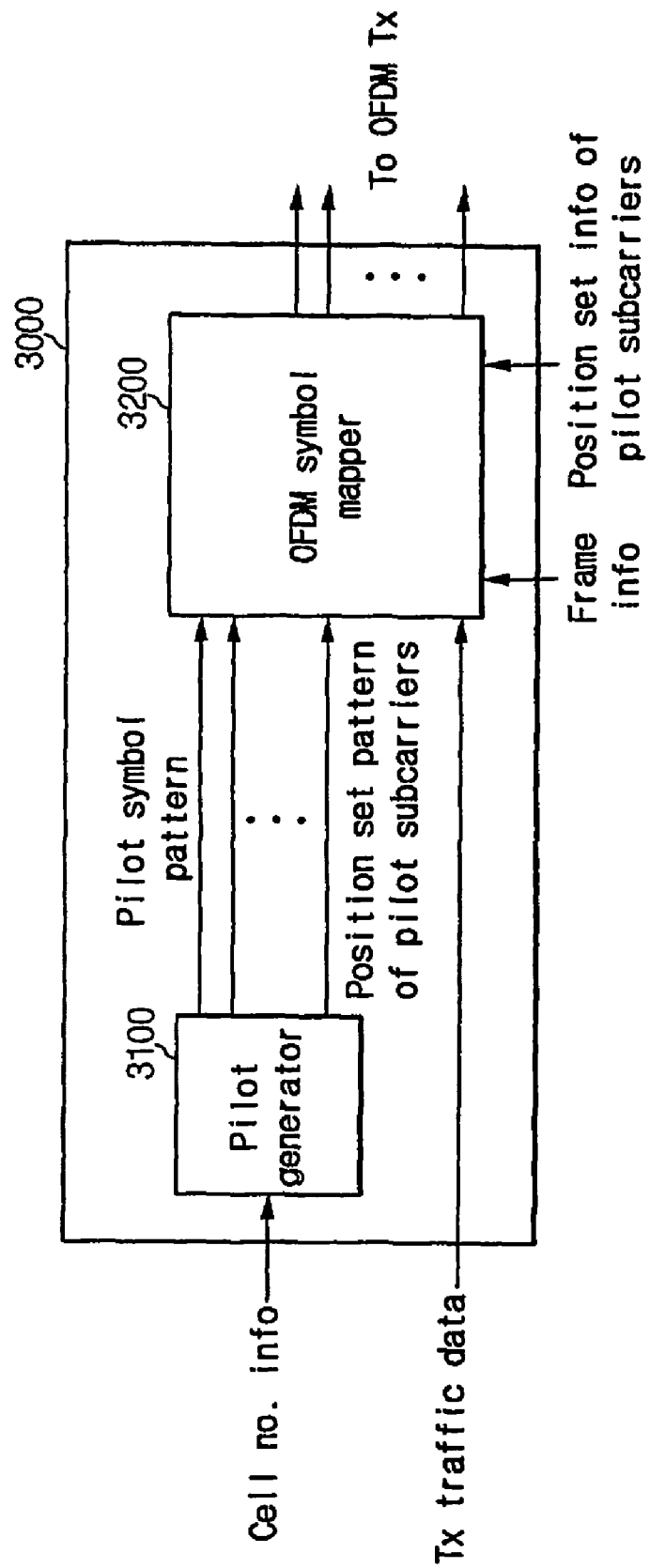
FIG. 14 shows a block diagram of a device for configuring a downlink signal of a base station in OFDMA cellular system according to an exemplary embodiment of the present invention.

FIG. 14 shows a block diagram of a device for configuring a downlink signal of a base station in OFDMA cellular system according to an exemplary embodiment of the present invention.

As shown, the device 3000 includes a pilot generator 3100 and an OFDM symbol mapper 3200.

The pilot generator 3100 receives cell number information to generate a pattern of a position set of pilot subcarriers and a pattern of a pilot symbol according to cell information, and the OFDM symbol mapper 3200 receives traffic data information, frame structure information defined with respect to the time and frequency axes as described with reference to FIGS. 1 and 2, and information on the position set of pilot subcarriers as described with reference to FIGS. 3A and 3B, maps pilot subcarrier symbol information and traffic data information on the defined time and frequency, and outputs mapped results.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, time and frequency synchronization and cell search are estimated by using the pilot subcarriers which are inserted into symbols and are then transmitted without using additional preambles, and cell search is performed after estimating the cell for the purpose of handover in the OFDMA-FDD and OFDMA-TDD cellular system.

Also, the cell search and the integer-times frequency synchronization estimation are performed as a single process in the OFDMA-FDD cellular system, the cell search, the integer-times frequency synchronization estimation, and the downlink estimation are performed as a single process in the OFDMA-TDD cellular system, and accordingly, downlink synchronization and cell search are performed with a less amount of calculation in the OFDMA-FDD and OFDMA-TDD cellular system.

Further, the synchronization and cell search are performed by the same device when an OFDMA-FDD cellular system and an OFDMA-TDD cellular system are provided in a micro cell and a hot spot.

What is claimed is:

1. A method of configuring a downlink signal in an orthogonal frequency division multiplexing access-frequency division duplexing (OFDMA-FDD) mobile communication system, said method comprising:

(a) configuring a downlink frame with a plurality of symbols; and (b) for each symbol, allocating a plurality of traffic subcarriers and a plurality of pilot subcarriers, said pilot subcarriers being distributed with respect to both time and frequency, a part of said pilot subcarriers being reference for a mobile station to perform time synchronization, frequency synchronization, and cell search;

wherein the pilot subcarriers are distributed at regular intervals with respect to time, and are distributed at irregular intervals with respect to frequency;

said system comprises a plurality of cells;

the pilot subcarriers are allocated to the cells according to proper position sets of pilot subcarriers so that the pilot subcarriers in adjacent cells are not superimposed;

when the number of cells is greater than an available number of the proper position sets, the pilot subcarriers are allocated so as to minimize a number of pilot subcarriers that are superimposed in non-adjacent cells;

the cells are divided into groups of cells;
a predetermined number of said pilot subcarriers are allocated for each cell, said predetermined number being generated by dividing the number of subcarriers by the number of cells;
as to insufficient pilot subcarriers, part of said pilot subcarriers being allocated for each cell are allocated to the cells which have the same position in different groups; and
the proper position set $K_{ig+j}$ of pilot subcarriers allocated to each $j^{th}$ cell of each $i^{th}$ cell group is determined according to the following equations $$K=\{f_{K,0}, f_{K,1}, \ldots, f_{K,gN_p-1}\}$$

$$h_i(k)=v(k)+(ik) \bmod g$$

$$K_{ig+j}=\{f_{K,r} | r=kg+(h_{i \bmod g}(k)+j) \bmod g\}$$

where
g is a prime number that satisfies $Nu/Np \geq g$;
Nu is the number of subcarriers;
Np is the number of subcarriers included in each cell group;
G is the number of cells in each cell group, wherein G<g;
K is a set of subcarriers $f_{K,O}, f_{K,1}, \ldots f_{K,gN_p-1}$ selected to be pilot subcarriers;
$h_{i \bmod g}$ is a default sequence allocated to the $i^{th}$ cell group;
v(k) is a specified pseudo random sequence having values from 0 to (g−1); and
j is a valued from 0 to (G−1).

2. The method of claim 1, wherein the pilot subcarriers are not punctured at a position other than the position of subcarriers used for transmission to the mobile station, whereby the pilot subcarriers are not transmitted.

* * * * *